United States Patent
Karlsson et al.

(10) Patent No.: US 8,980,062 B2
(45) Date of Patent: Mar. 17, 2015

(54) INDUSTRIAL FABRIC COMPRISING SPIRALLY WOUND MATERIAL STRIPS AND METHOD OF MAKING THEREOF

(71) Applicant: Albany International Corp., Rochester, NH (US)

(72) Inventors: Jonas Karlsson, Falkenberg (SE); Anders Nilsson, Halmstad (SE); Mikael Danielsson, Halmstad (SE); Marcus Backstrom, Halmstad (SE)

(73) Assignee: Albany International Corp., Rochester, NH (US)

( * ) Notice: Subject to any disclaimer, the term of this patent is extended or adjusted under 35 U.S.C. 154(b) by 156 days.

(21) Appl. No.: 13/727,224

(22) Filed: Dec. 26, 2012

(65) Prior Publication Data

US 2014/0174689 A1    Jun. 26, 2014

(51) Int. Cl.
    *D21F 1/10*      (2006.01)
    *B29C 53/78*      (2006.01)
    *D21F 7/08*      (2006.01)
    *D21F 7/10*      (2006.01)
    (Continued)

(52) U.S. Cl.
    CPC    *D21F 7/08* (2013.01); *B29D 29/00* (2013.01); *D21F 1/0036* (2013.01); *D21F 1/0054* (2013.01); *D21F 1/0063* (2013.01); *D21F 3/0227* (2013.01); *D21F 3/0236* (2013.01); *D21F 7/083* (2013.01); *D21F 7/10* (2013.01); *Y10S 162/90* (2013.01); *Y10S 162/901* (2013.01); *Y10S 162/902* (2013.01); *Y10S 162/903* (2013.01); *Y10S 162/904* (2013.01)

USPC ............ 162/358.2; 162/348; 162/358.4; 162/900; 162/901; 162/902; 162/903; 162/904; 156/169; 156/181; 156/73.2; 156/73.4

(58) Field of Classification Search
    CPC ....... D21F 1/0063; D21F 1/0081; D21F 1/10; D21F 7/08; D21F 7/10; D21F 7/12; D21F 3/0227; D21F 3/0236; B29C 53/56; B29C 53/58; B29C 53/78
    USPC ........... 162/348, 358.1, 358.2, 900, 902–904, 162/361, 362, 358.4, 901; 139/383 A, 139/383 AA, 425 A; 156/169, 173, 180, 181, 156/73.1, 73.2, 73.4; 28/110, 142
    See application file for complete search history.

(56) References Cited

U.S. PATENT DOCUMENTS 3,323,226 A    6/1967    Beaumont et al.
4,495,680 A    1/1985    Beck
(Continued)

FOREIGN PATENT DOCUMENTS

EP      0538211 B1    7/1995
WO    WO 2013/170038 A1    11/2013

*Primary Examiner* — Eric Hug
(74) *Attorney, Agent, or Firm* — Frommer Lawrence & Haug LLP; Ronald R. Santucci (57) ABSTRACT

An industrial fabric, belt or sleeve and a method of making the fabric, belt or sleeve are disclosed. The industrial fabric, belt or sleeve is produced by spirally winding strips of polymeric material, such as an industrial strapping or ribbon material, around two rolls in a side-to-side manner in which a gap between adjacent edges is formed. A second material, for example a gap filler material, is placed between the adjacent edges, and the adjoining edges are joined by melting the filler material, strips of polymeric material, or both. The gap filler material can have a specific cross-sectional shape corresponding to the gap.

39 Claims, 9 Drawing Sheets

(51) Int. Cl.
*D21F 7/12* (2006.01)
*B29D 29/00* (2006.01)
*D21F 1/00* (2006.01)
*D21F 3/02* (2006.01)

(56) References Cited

U.S. PATENT DOCUMENTS

| | | |
|---|---|---|
| 4,537,658 A | 8/1985 | Albert |
| 4,541,895 A | 9/1985 | Albert |
| 4,842,905 A | 6/1989 | Stech |
| 5,360,656 A | 11/1994 | Rexfelt et al. |
| 6,290,818 B1 | 9/2001 | Romanski |
| 6,630,223 B2 | 10/2003 | Hansen |
| 6,989,080 B2 | 1/2006 | Hansen |
| 7,413,633 B2 | 8/2008 | Li et al. |
| 2007/0134467 A1 | 6/2007 | Sayers |
| 2010/0230064 A1* | 9/2010 | Eagles et al. ............ 162/289 |
| 2010/0236034 A1 | 9/2010 | Eagles et al. |
| 2013/0081772 A1* | 4/2013 | Eagles et al. ............ 162/358.2 |

* cited by examiner

INDUSTRIAL FABRIC COMPRISING SPIRALLY WOUND MATERIAL STRIPS AND METHOD OF MAKING THEREOF

INCORPORATION BY REFERENCE

All patents, patent applications, documents, references, manufacturer's instructions, descriptions, product specifications, and product sheets for any products mentioned herein are incorporated by reference herein, and may be employed in the practice of the invention.

BACKGROUND OF THE INVENTION

1. Field of the Invention

The present invention relates to endless industrial fabrics. More specifically, the present invention relates to industrial belts or sleeves used in the paper making process, namely forming, press, dryer fabrics, and through air dryer (TAD) fabrics, also known as paper machine clothing, on which paper is manufactured in a papermaking machine. Also, the invention may be used as a substrate for a shoe press or transfer or calender belt, any of which can also be used on a paper machine. In addition, the present invention may be applied in other industrial settings where industrial belts are used to convey and/or dewater a material. Furthermore, the present invention may be used as a belt and/or sleeve in the production of nonwovens by processes such as airlaid, melt blowing, spunbonding, and hydroentangling.

2. Description of the Prior Art

During the papermaking process, a cellulosic fibrous web is formed by depositing a fibrous slurry, that is, an aqueous dispersion of cellulose fibers, on a moving forming fabric in the forming section of a paper machine. A large amount of water is drained from the slurry through the forming fabric, leaving the cellulosic fibrous web on the surface of the forming fabric.

The newly formed cellulosic fibrous web proceeds from the forming section to a press section, which includes a series of press nips. The cellulosic fibrous web passes through the press nips supported by a press fabric, or, as is often the case, between two such press fabrics. In the press nips, the cellulosic fibrous web is subjected to compressive forces which squeeze water therefrom, and which adhere the cellulose fibers in the web to one another to turn the cellulosic fibrous web into a paper sheet. The water is accepted by the press fabric or fabrics and, ideally, does not return to the paper sheet.

The paper sheet finally proceeds to a dryer section, which includes at least one series of rotatable dryer drums or cylinders, which are internally heated by steam. The newly formed paper sheet is directed in a serpentine path sequentially around each in the series of drums by a dryer fabric, which holds the paper sheet closely against the surfaces of the drums. The heated drums reduce the water content of the paper sheet to a desirable level through evaporation.

It should be appreciated that the forming, press and dryer fabrics all take the form of endless loops on the paper machine and function in the manner of conveyors. It should further be appreciated that paper manufacture is a continuous process which proceeds at considerable speed. That is to say, the fibrous slurry is continuously deposited onto the forming fabric in the forming section, while a newly manufactured paper sheet is continuously wound onto rolls after it exits from the dryer section.

It should also be appreciated that the vast majority of forming, press and dryer fabrics are, or at least include as a component, woven fabric in the form of an endless loop having a specific length, measured longitudinally therearound, and a specific width, measured transversely thereacross. Because paper machine configurations vary widely, paper machine clothing manufacturers are required to produce forming, press and dryer fabrics to the dimensions required to fit particular positions in the forming, press and dryer sections of the paper machines of their customers. Needless to say, this requirement makes it difficult to streamline the manufacturing process, as each fabric must typically be made to order.

Moreover, because the surface of a woven fabric is necessarily uneven to some degree, as knuckles are formed where yarns lying in one direction of the fabric wrap around those lying in another direction lie on the surface, it is difficult to produce a paper product entirely free of sheet marking.

The prior art includes several attempts to solve these problems. For example, U.S. Pat. No. 3,323,226 to Beaumont et al. relates to a synthetic dryer belt comprising one or more plies of polyester film. Perforations through the belt are formed by mechanical punching. U.S. Pat. No. 4,495,680 to Beck shows a method and apparatus for forming a base fabric composed solely of warp yarns to be used in making a papermaker's belt. Essentially, the warp yarns are helically wound about two parallel rolls. Subsequently, fibrous batting or other nonwoven material is applied and adhered to the helical array of warp yarns to provide a fillingless papermaker's belt, which is to say that it has no cross-machine direction yarns.

U.S. Pat. No. 4,537,658 to Albert shows a papermaker's fabric made from a plurality of elongated, linked, slotted elements. The elongated elements are linked one to the next either by an integral tongue or through the use of a pintle connecting means which extends from one elongated element to the adjacent element. The elongated elements extend in the cross-machine direction (CD) of the disclosed papermaker's fabric, and have flat, parallel top and bottom surfaces.

U.S. Pat. No. 4,541,895 to Albert describes a papermaker's fabric made up of a plurality of nonwoven sheets laminated together to define a fabric or belt. The nonwoven sheets are perforated by laser drilling. Such sheets are composed of unoriented polymer material, and if produced in the fineness needed for papermaking applications, would lack sufficient dimensional stability to operate as endless belts on paper machines.

U.S. Pat. No. 4,842,905 to Stech shows a tessellated papermaker's fabric and elements for making the fabric. The elements are formed so as to have male or projection members which interlock with female or recess members. The papermaker's fabric comprises a plurality of the tessellated elements which have been interconnected to produce a tessellation of a desired length and width.

U.S. Pat. No. 6,290,818 to Romanski shows a shoe press belt wherein the base fabric is made from an endless tube of expanded film which can be perforated.

U.S. Pat. No. 6,630,223 to Hansen shows an industrial belt made from a plurality of spirally wound shaped (non-circular cross-section) monofilaments which are abutted to each other, side to side of adjacent turns and secured to one another by a suitable means.

U.S. Pat. No. 6,989,080 to Hansen shows a nonwoven papermaker's fabric made from a spirally wound machine direction (MD) base layer of raw stock, overlaid with a CD layer of similar or dissimilar raw stock and mated by suitable means.

U.S. Patent Application Publication No. 2007/0134467 A1 to Sayers provides a method comprising the steps of laminating a series of layers of film material and cutting perforations in the laminate to provide a foraminous fabric.

Fabrics in modern papermaking machines may have a width of from 5 feet to over 33 feet, a length of from 40 feet to over 400 feet and weigh from approximately 100 pounds to over 3,000 pounds. These fabrics wear out and require replacement. Replacement of fabrics often involves taking the machine out of service, removing the worn fabric, setting up to install a fabric and installing the new fabric. While many fabrics are endless, many of those used today are on-machine-seamable. Installation of the fabric includes pulling the fabric body onto a machine and joining the fabric ends to form an endless belt.

In response to this need to produce fabrics in a variety of lengths and widths more quickly and efficiently, fabrics have been produced in recent years using a spiral winding technique disclosed in commonly assigned U.S. Pat. No. 5,360,656 to Rexfelt et al. (hereinafter "the '656 patent"), the teachings of which are incorporated herein by reference.

The '656 patent shows a fabric comprising a base fabric having one or more layers of staple fiber material needled thereinto. The base fabric comprises at least one layer composed of a spirally wound strip of woven fabric having a width which is smaller than the width of the base fabric. The base fabric is endless in the longitudinal, or machine, direction. Lengthwise threads of the spirally wound strip make an angle with the longitudinal direction of the fabric. The strip of woven fabric may be flat-woven on a loom which is narrower than those typically used in the production of paper machine clothing.

SUMMARY OF THE INVENTION

The present invention provides an alternative solution to the problems addressed by these prior-art patents/patent applications.

One embodiment of the present invention is an industrial fabric or belt for use in the forming, press or dryer section, including a through air dryer (TAD), of a paper machine. The fabric or belt of the present invention may also be used as a sheet-transfer, long nip press (LNP) or calender belt, or as other industrial process belts, such as corrugator belts. The fabric or belt may also be used as part of a textile finishing belt, such as a sanforizing belt or tannery belt, for example. Moreover, the fabric of the invention may be used in other industrial settings where industrial belts are used to convey and/or dewater a material. For example, the fabric may be used in a pulp-forming or pulp-pressing belt, in a belt used to dewater recycled paper during the deinking process, such as a dewatering belt on a double-nip-thickener (DNT) deinking machine; or in a sludge dewatering belt. The inventive fabric may also be used in a belt and/or sleeve used in the production of nonwovens by processes such as airlaid, spunbonding, melt blowing or hydroentangling. The belt and/or sleeve can be in the form of an endless loop, and can have an inner surface and an outer surface.

In an exemplary embodiment, the endless belt is formed from strips of material that are spiral wound around two rolls in a side to side abutting manner. The strips are firmly attached to each other by a suitable method to form an endless loop at the required length and width for the desired use. The strips or ribbons of material may be reinforced with reinforcing elements known in the art, including, but not limited to, fibers, yarns, wires, woven or non-woven fabrics.

In the case of a sleeve, the strips may be wound around the surface of a single roll or mandrel which is approximately the size of the diameter and CD length of the drum on which the sleeve will be used. The strips of material used are produced as polymeric ribbon or industrial strapping material. Strapping, especially plastic strapping material, is usually defined as a relatively thin plastic band used for fastening or clamping objects together. An example of such a strapping material is disclosed in commonly assigned U.S. Pre-Grant Publication No. 20100236034, for example. Polymeric ribbon is usually defined as a relatively thin band of polymeric material. Surprisingly, it was discovered that these types of plastic material have the appropriate characteristics to be the material strips used to form the inventive belt. Any of the strips or ribbon materials used in forming the instant belt can be reinforced by fibers or yarns oriented in MD, CD, or both.

The difference in definition between polymeric ribbon and monofilament is related to size, shape and application. Both polymeric ribbon and monofilament are made by extrusion processes that have the same basic steps of extrusion, orientation and winding. Monofilament is generally smaller in size than ribbon and strapping, and usually round or rectangular in shape. Monofilament is used in a wide variety of applications such as fishing lines and industrial fabrics, including paper machine clothing. Polymeric ribbon and strapping is generally much larger in size than monofilament and always wider along a major axis, and as such, being substantially rectangular in shape for its intended purpose.

It is well known in the art of extrusion that polymeric ribbon/strapping is made by an extrusion process. It is also well known that this process includes uniaxial orientation of the extruded material. It is also well known that there are two basic extrusion processes using uniaxial orientation. One process is the extrusion and orientation of a wide sheet that is slit into individual ribbons. The other process is the extrusion of individual ribbons that are oriented. This second process is very much like the process of making monofilament as evidenced by the similarity in equipment for both processes.

An advantage of using polymeric ribbon and strapping material versus monofilament is the number of spiral windings needed to produce a fabric, according to the method disclosed in the '656 patent, for example. Monofilaments are usually considered to be yarns that are no larger than 5 mm in their largest cross sectional axis. Uniaxial monofilament sizes used for paper machine clothing and the other aforementioned uses seldom exceed 1.0 mm in their largest cross sectional axis. The ribbon or strapping material used, however, is usually at least 10 mm in width and can exceed 100 mm in width. It is envisioned that ribbons or strips of material up to 1000 mm in width could be also used.

The instant invention provides an improved fabric, belt or sleeve that functions in place of a traditional belt or sleeve, and imparts desired physical characteristics, such as smoothness, bulk, appearance, texture, absorbency, strength, and hand to the paper, nonwoven, or other product produced thereon.

Other advantages such as, but not limited to, improved fiber support and release (no picking) over prior art woven fabrics, and easier cleanability as a result of no yarn crossovers to trap elementary fibers are provided. If the belt/sleeve has a surface texture, then more effective patterning/texture is transferred to the tissue/nonwoven, and it also results in better physical properties such as bulk/absorbency of the paper/nonwoven.

Yet another advantage is thickness versus tensile modulus. Polyester (PET) films in the prior art, for example, have a tensile modulus in the long axis (or machine direction, MD) of about 3.5 GPa. PET ribbon/strapping material has a tensile modulus ranging from 10 GPa to 12.5 GPa. In other words, to achieve the same modulus with a film, a structure would have to be 3 to 3.6 times thicker.

The invention therefore, according to one exemplary embodiment, is a fabric, belt or sleeve formed as a single or multi layer structure from these spirally wound ribbons. The fabric, belt or sleeve may have planar, smooth top and bottom surfaces. The fabric, belt or sleeve may also be textured in some manner using any of the means known in the art, such as, for example, sanding, graving, embossing, etching, etc. The belt can be impermeable to air and/or water. The belt can also be perforated by some mechanical or thermal (for example, laser) means so it may be permeable to air and/or water.

In another exemplary embodiment, the longitudinal or length-wise edges of the ribbon strip have a profile shaped to facilitate joining with the adjacent ribbon edges. The ribbon may be formed with the desired profile during the extrusion process or the profile may be formed in a separate machining step.

In a non-limiting embodiment, the belt is formed by spirally winding a strip of polymeric material around two rolls in a side-to-side manner in which a gap between adjacent edges is formed. The strip of polymeric material can be reinforced using fibers or yarns in the MD, CD, or both. A second material, for example a filler material, may be placed between the adjacent edges, wherein a cross-sectional shape of the filler material corresponds to the cross-sectional shape of the gap between adjacent edges to bond/join the edges to each other. The filler material may be reinforced or non-reinforced. The filler material may have a specific cross-sectional shape corresponding to the gap. The filler may be provided in the form of rods. Non-limiting examples of filler material cross-section include circular, oval, rectangular, or triangular. Alternately, the filler material may be added as a thermoplastic meltable material to fill the gap profile between the ribbon edges.

The fabric, belt or sleeve of the present invention may optionally include a functional coating on one or both of its surfaces. The functional coating may have a top surface that is planar or smooth, or may alternatively be textured in some manner using any of the means known in the art, such as for example, sanding, graving, embossing or etching. The functional coating can be any of the materials known to one of ordinary skill in the art, such as for example, polyurethane, silicone, or any other polymeric resin material or even rubber. The functional coating (and/or the material strips themselves) may optionally include particles such as nano fillers, which can improve resistance to flex fatigue, crack propagation or wear characteristics of the inventive fabric, belt or sleeve. Examples of coatings including nano fillers are disclosed in commonly assigned U.S. Pat. No. 7,413,633, for example, the entire contents of which are incorporated herein by reference.

The fabric, belt or sleeve of the present invention may also be used as a reinforcing base or substrate in a forming fabric, press fabric, dryer fabric, through air dryer (TAD) fabric, shoe press or transfer or calender belt, a process belt used in airlaid, melt blowing, spunbonding, or hydroentangling processes, sheet-transfer belt, long nip press (LNP) or calender belt, corrugator belt, sanforizing belt, tannery belt, pulp-forming or pulp-pressing belt, dewatering belt on a double-nip-thickener (DNT) deinking machine, or sludge dewatering belt.

While the embodiments above are for a single layer of strips of spirally wound ribbon, there may be advantages to use strips with various geometries that form a belt of two or more layers. The layers may be such that the strips are spirally wound at an angle to each other, or at an angle relative to the machine direction (MD) of the belt or sleeve. In some embodiments, the first layer may be wound at an angle measured in a positive direction from the MD of the belt or sleeve. The second layer may be wound at the same angle measured in a negative direction to the MD of the belt, that the second layer is spirally wound in a direction opposite to the direction of the first layer. Therefore, according to one exemplary embodiment the belt may have two or more layers where the strips may be formed such that the two or more layers mechanically, chemically, or adhesively interlock or are attached together by other means known to those skilled in the art. Again the structure can be either impermeable or perforated to be permeable to either air and/or water.

While the term fabric, industrial fabric, and fabric structure are primarily used in this disclosure, fabric, belt, conveyor, sleeve, support member, and fabric structure are used interchangeably to describe the structures of the present invention. Similarly, the terms ribbon, polymeric ribbon, strip of material, strip of polymeric material, industrial strapping, and material strips are used interchangeably throughout the description.

It is understood that the term "mid plane" as used throughout this disclosure refers to a plane bisecting the thickness of the polymeric strip into two equal or substantially equal parts. The thickness 't' is understood to be the distance between the upper surface and the lower surface of a strip of polymeric material.

The various features of novelty which characterize the invention are pointed out in particularity in the claims annexed to and forming a part of this disclosure. For a better understanding of the invention, its operating advantages and specific objects attained by its uses, reference is made to the accompanying descriptive matter in which preferred, but non-limiting, embodiments of the invention are illustrated in the accompanying drawings in which corresponding components are identified by the same reference numerals.

Terms "comprising" and "comprises" in this disclosure can mean "including" and "includes" or can have the meaning commonly given to the term "comprising" or "comprises" in U.S. Patent Law. Terms "consisting essentially of" or "consists essentially of" if used in the claims have the meaning ascribed to them in U.S. Patent Law. Other aspects of the invention are described in or are obvious (and within the ambit of the invention) from the following disclosure.

BRIEF DESCRIPTION OF THE DRAWINGS

The accompanying drawings, which are included to provide a further understanding of the invention, are incorporated in and constitute a part of this specification. The drawings presented herein illustrate different embodiments of the invention and together with the description serve to explain the principles of the invention. In the drawings.

DETAILED DESCRIPTION OF THE PREFERRED EMBODIMENTS

Figure 1:
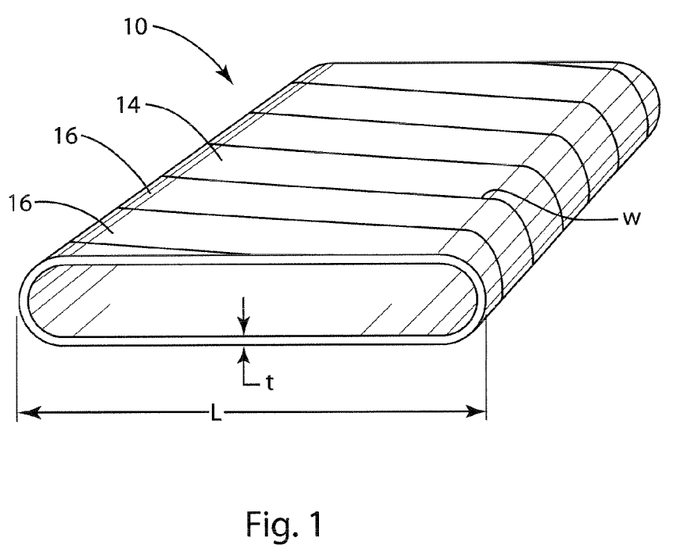
FIG. 1 is a perspective view of a fabric, belt or sleeve according to one aspect of the present invention.

Now turning to the figures, FIG. 1 is a perspective view of the industrial fabric, belt or sleeve 10 (hereinafter merely "industrial fabric" or "fabric") of the present invention. The fabric 10 has an inner surface 12 and an outer surface 14, and is produced by spirally winding a strip of polymeric material 16, for example a polymeric ribbon, in a plurality of abutting and mutually adjoined turns. The strip of material 16 spirals in a substantially longitudinal direction around the length L of the fabric 10 by virtue of the helical fashion in which the fabric 10 is constructed.

Figure 2:
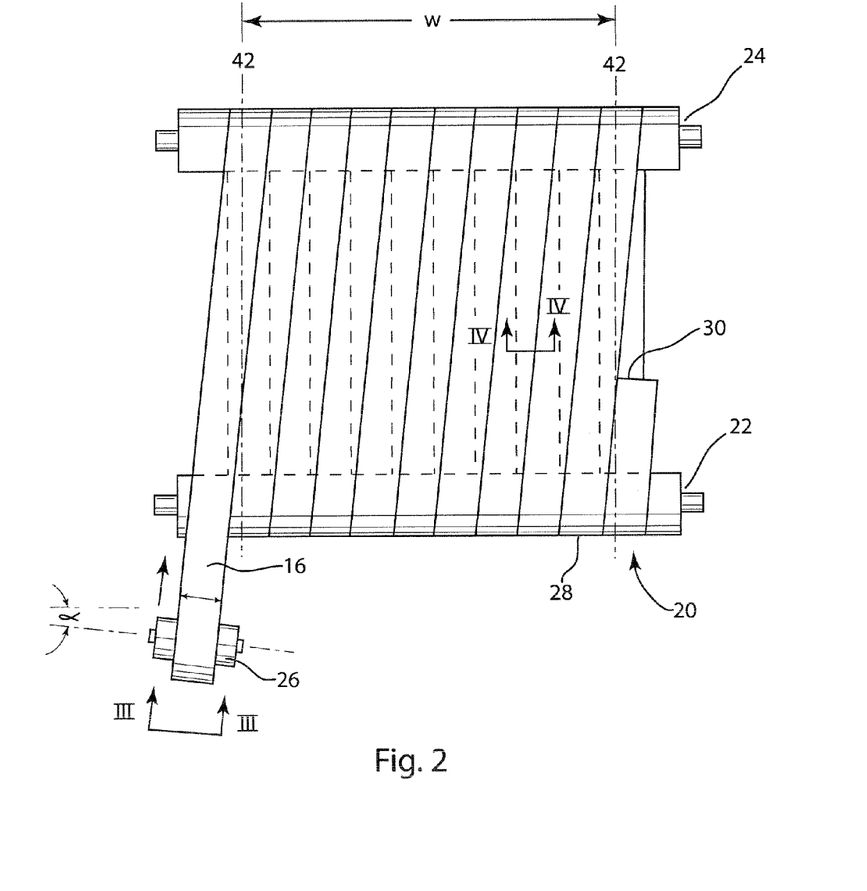
FIG. 2 illustrates a method by which the fabric, belt or sleeve of the present invention may be constructed.

An exemplary method by which the fabric 10 may be manufactured is illustrated in FIG. 2. Apparatus 20 includes a first process roll 22 and a second process roll 24, each of which is rotatable around its longitudinal axis. The first process roll 22 and the second process roll 24 are parallel to one another, and are separated by a distance which determines the overall length of the fabric 10 to be manufactured thereon, as measured longitudinally. At the side of the first process roll 22, there is provided a supply reel 26 rotatably mounted about an axis and displaceable parallel to process rolls 22 and 24. The axis of reel 26 may be positioned at an angle α to the axes of process rolls 22 and 24 as illustrated in FIG. 2. The supply reel accommodates a reeled supply of the strip of polymeric material 16 having a width W of 10 mm or more, for example. The supply reel 26 is initially positioned at the right-hand end of the first process roll 22, for example, before being continuously displaced to the left or other side at a predetermined speed as it provides the polymeric strip or ribbon of material in the direction shown by the arrow in FIG. 2. The supply reel 26 may be displaced parallel to the axis of the process rolls 22, 24 until a desired belt width is obtained. The length-wise edges of an in-production spirally wound belt may be trimmed, for example at 42, to provide the desired finished belt width w.

To begin the manufacture of the fabric 10, the beginning of the strip or ribbon of polymeric material 16 is extended in taut condition from the first process roll 22 toward the second process roll 24, around the second process roll 24, and back to the first process roll 22 forming a first coil of a closed helix 28. To close the first coil of the closed helix 28, the beginning of the strip of material 16 is joined to the end of the first coil thereof at point 30. As will be discussed below, adjacent turns of the spirally wound strip of material 16 are joined to one another, forming continuous seam 30.

Therefore, subsequent coils of closed helix 28 are produced by rotating first process roll 22 and second process roll 24 in a common direction and speed, while feeding the strip of material 16 onto the first process roll 22 as indicated by the arrow in FIG. 2. At the same time, the strip of material 16 being freshly wound onto the first process roll 22 is continuously joined to that already on the first process roll 22 and the second process roll 24 using the method described herein below.

This process continues until the closed helix 28 has a desired width, as measured axially along the first process roll 22 or the second process roll 24. At that point, the strip of material 16 not yet wound onto the first process roll 22 and the second process roll 24 is cut, and the closed helix 28 produced therefrom is removed from the first process roll 22 and the second process roll 24 to provide the fabric 10 of the present invention.

Although a two roll set up is described herein, it may be apparent to one of ordinary skill in the art that the strips may be wound around the surface of a single roll or mandrel, or on a set up of more than two rolls, to form the instant fabric. A roll or mandrel, or system of rolls or mandrels, of appropriate size may be selected based on the desired dimension of the fabric, belt or sleeve to be produced.

The present method for producing fabric, belt or sleeve 10 is quite versatile and adaptable to the production of industrial fabrics or belts of a variety of longitudinal and transverse dimensions. That is to say, the manufacturer, by practicing the present invention, need no longer produce a woven fabric of appropriate length and width for a given paper machine. Rather, the manufacturer need only separate the first process roll 22 and the second process roll 24 by the appropriate distance, to determine the approximate length of the fabric, belt or sleeve 10, and wind the strip of material 16 onto the first process roll 22 and the second process roll 24 until the closed helix 28 has reached the approximate desired width.

Further, because the fabric 10 is produced by spirally winding a strip or ribbon of polymeric material 16, and is not a woven fabric, the outer surface 14 of the fabric, belt or sleeve 10 is smooth and continuous, and lacks the knuckles which prevent the surfaces of a woven fabric from being perfectly smooth. The fabrics, belts, or sleeves of the present invention may, however, have geometrical characteristics that provide enhanced topography and bulk if, for example, tissue or non-woven products are produced thereon. Other non-limiting advantages of the instant industrial fabric include, for example, easier sheet or web release, improved contamination resistance, and reduced fiber picking.

Yet another non-limiting advantage is that the fabric avoids the constraints of and need for a conventional weaving loom to create a permeable fabric, if desired, because voids (to be discussed below) can be placed in any desired location or pattern to create the desired permeability.

Exemplary fabrics may have a texture on one or both surfaces 12, 14 produced using any of the means known in the art, such as, for example, sanding, graving, embossing or etching. Alternatively, the fabric, belt or sleeve may be smooth on one or both surfaces.

FIGS. 3(A) through 3(E) are cross-sectional views, taken in a widthwise direction according to III-III of FIG. 2, of several embodiments of the strip of material used to produce the present fabric, belt or sleeve. Each embodiment includes upper and lower surfaces 32, 34 which may be flat (planar) and parallel to one another, or may have a certain profile intended to suit a particular application.

Figure 3A:
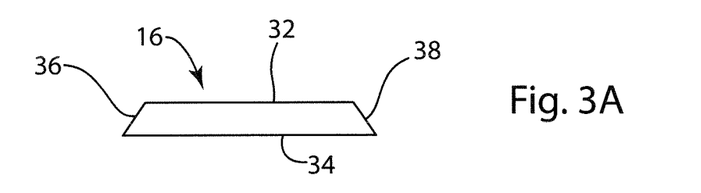
FIGS. 3(A) through 3(E) are cross-sectional views taken in the widthwise direction along line III-III in FIG. 2, depicting several embodiments of the strip of the material used to manufacture the inventive fabric, belt or sleeve.
Figure 4A:
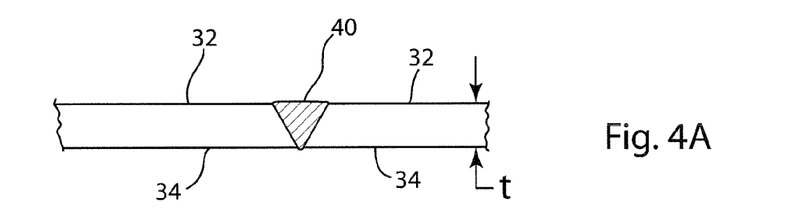
FIGS. 4(A) through 4(E) are cross-sectional views taken in the widthwise direction along line IV-IV in FIG. 2, depicting several embodiments of seams or joints formed by the strip of material of FIGS. 3(A) through 3(E)

Turning to FIG. 3(A), material strip 16 has an upper surface 15, a lower surface 34, a first edge surface 36 and a second edge surface 38, according to one embodiment of the invention. The upper surface 32 and the lower surface 34 may be flat (planar) and parallel to one another, and the first edge surface 36 and the second edge surface 38 may be slanted towards each other at approximately the same acute angle with respect to lower surface 34. When first edge surface 36 is placed adjacent to the second edge surface 38 of the immediately preceding turn thereof, with or without any portion of the surfaces touching, a tapered void or gap in the shape of a V results. A filler material 40, such as a rod, may be placed within the gap to fill the gap and joins/bonds the two adjacent strip edges together, as illustrated generally in FIG. 4(A), wherein a cross-sectional shape of the filler material corresponds to the cross-sectional shape of the gap.

Figure 3B:
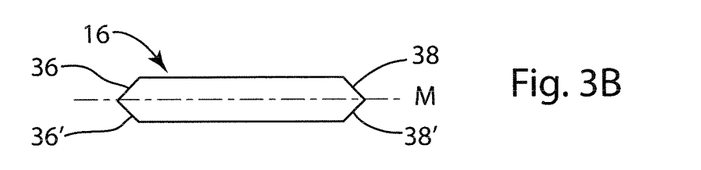
Figure 4B:
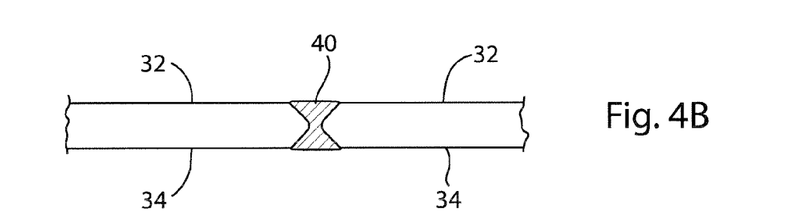

In FIG. 3(B), material strip 16 has upper 32 and lower 34 surfaces and first and second paired edge surfaces 36, 36' and 38, 38'. Edge surface 36 extends from upper surface 32 at an angle directed toward the lower surface 34 of strip 16. Edge surface 36' extends from lower surface 34 at an angle directed toward the upper surface 32 of strip 16. The angles of inclination may or may not be the same. The resultant edge surface profile comes to a point at the intersection of 36 and 36'. The intersection may be at the mid plane M of the strip 16 as illustrated or may be above or below the mid plane. A similar profile is formed at the second edge surface formed by 38 and 38' with the same, or different, angles of inclination. When first paired edge surface 36, 36' is placed adjacent to the second paired edge surface 38,38' of the immediately preceding turn of strip 16, a void or gap in the shape of a X results, formed generally by an upright V and an inverted V with vertices generally in vertical alignment. As above, a filler material or rod 40 may be placed in the gap thus formed, and joins/bonds the two adjacent strip edges together, as illustrated generally in FIG. 4(B).

Figure 3C:
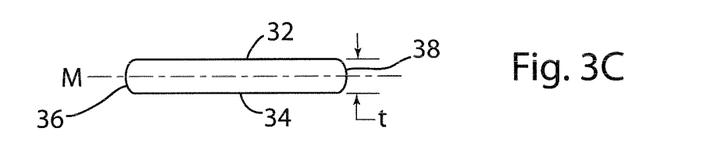
Figure 4C:
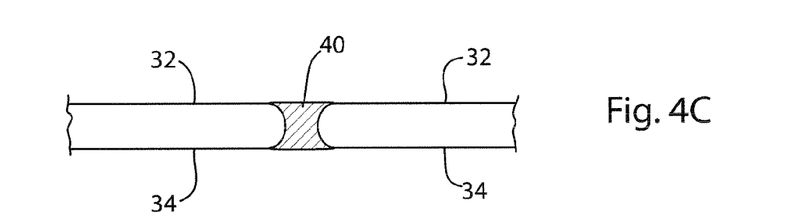

The polymeric strip 16 illustrated in FIG. 3(C) includes convex edge surfaces 36 and 38. The curvature of convex surfaces 36, 38 may generally be centered on the thickness of the ribbon 16, i.e., the center of curvature generally lies on the mid plane M of the strip 16. Alternately, the center of curvature may lie above or below the mid plane M of the strip. The radius of curvature may be greater than one half of the thickness t of the strip 16 as illustrated. The radius of curvature may also be equal to, or less than, one half of the strip thickness t. When first edge surface 36 is placed adjacent to the second edge surface 38 of the immediately preceding turn thereof, a gap results generally in the form of a rounded X, similar to the gap formed by the strip illustrated in 3(B). The gap formed by the edges 36, 38 illustrated in 3(C) is generally shown in FIG. 4(C), with filler material or rod 40 placed within the gap, and joins/bonds the two adjacent strip edges together.

Figure 3D:
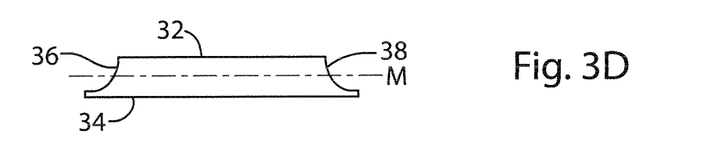
Figure 4D:
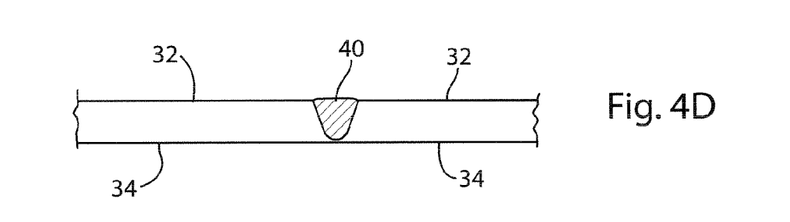

The polymeric strip 16 of FIG. 3D has concave first and second edge surfaces 36 and 38. Concave surfaces 36, 38 may have the same or different radii of curvature. The center of curvature generally lies above the mid plane of the strip 16 (as illustrated) and the radius of curvature may be the same as, less than, or greater than one half of the thickness t of the strip 16. When first edge surface 36 is placed adjacent to the second edge surface 38 of the immediately preceding turn, a generally U-shaped gap results. The gap formed by the edges 36, 38 illustrated in 3(D) is generally shown in FIG. 4(D), with filler material or rod 40 placed within the gap, and joins/bonds the two adjacent strip edges together.

Figure 3E:
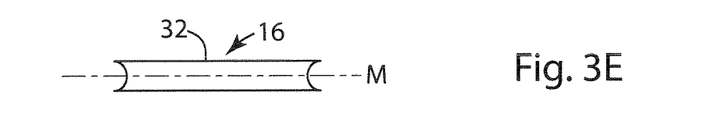
Figure 4E:
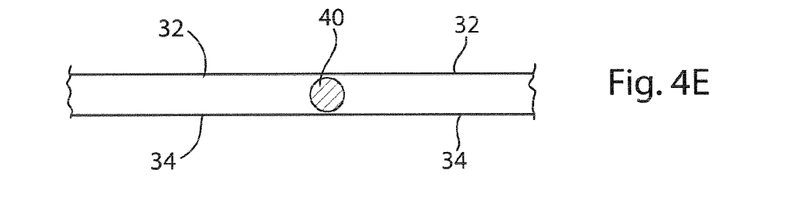

The polymeric strip 16 of FIG. 3E has concave first and second edge surfaces 32 and 34. Concave surfaces 32, 34 may have the same or different radii of curvature, with the center of curvature lying on the mid plane of the strip 16 and the radius of curvature may be the same as, less than, or greater than one half of the thickness t of the strip 16. In the exemplary, non-limiting embodiment shown in FIG. 3(E), the radius of curvature of first edge surface 36 is the same as, or substantially the same as, the radius of curvature of second edge surface 38. As illustrated, the radius of curvature is substantially half of the thickness of the strip thickness t. Under that condition, when first edge surface 36 is placed adjacent to the second edge surface 38 of the immediately preceding turn, a gap with a circular or substantially circular cross section may result. This condition is illustrated generally in FIG. 4(E) with filler material or rod 40 placed within the gap, and joins/bonds the two adjacent strip edges together.

Similar results may be achieved if first and second edge surfaces 36, 38 have the same radius of curvature, centered on the mid plane M of the strip 16, the curvature sized to be less than one half of the strip thickness t.

In embodiments of FIG. 3(E) in which the radii of curvature of first and second edge surfaces 36, 38 are larger than one half of the strip thickness, a generally ovular gap may result when first edge surface 36 is placed adjacent to the second edge surface 38 of the immediately preceding turn.

Other profiles may be formed on the first and second edge surfaces 36, 38 as would be obvious to one of ordinary skill in the art.

The strip or ribbon of material described in the above embodiments may be formed, for example by an extrusion process, from any polymeric resin material known to those of ordinary skill in the art, such as for example, polyester, polyamide, polyurethane, polypropylene, polyether ether ketone resins, etc.

The filler material 40 may be formed as rods, for example by extrusion, with a cross section similar to, or the same, the gap formed by the first and second edge surfaces 36, 38 of adjacent turns of the polymeric strip or ribbon 16. The filler material 40 may be formed from the same material as the polymeric strip 16 or may be formed from a different material. Both, the strip or ribbon material and the filler material may be reinforced using functional tensile strength bearing fibers or yarns in the MD, CD, or both. These reinforcing fibers or yarns may be made from any polymeric resin material known to those of ordinary skill in the art, such as for example, polyester, polyamide, polyurethane, polypropylene, polyether ether ketone resins, or other materials such aramids, glass, or industrial nylon.

According to one embodiment of the invention, the filler material or rod 40 can be subject to an energy source, such as, for example, infrared radiation (IR), ultrasonic waves, or a laser beam, such that the filler material or rod at least partially melts, thereby joining the edge surfaces 36, 38. Alternatively, the energy source may be used to at least partially melt the edge surfaces 36, 38, such that the filler material or rod 40 is sandwiched between the melted edge surfaces, thereby joining the edge surfaces 36, 38.

As described above and illustrated in FIGS. 4(A) through 4(E), the filler material 40 may have cross sections in the form of a V, an X, a rounded X, a U, a circle, or an oval. Other cross sectional shapes, corresponding to first and second edge surface 36, 38 profiles would be obvious to one of ordinary skill in the art.

Figure 5A:
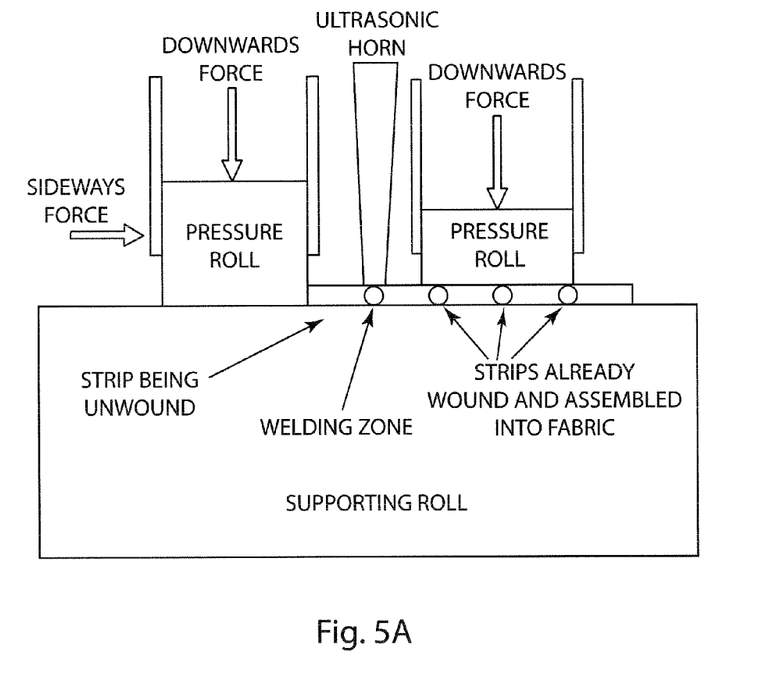
FIGS. 5(A) and 5(B) are schematics of illustrative apparatuses that may be used to weld a portion of the fabric, belt or sleeve according to one aspect of the present invention.
Figure 5B:
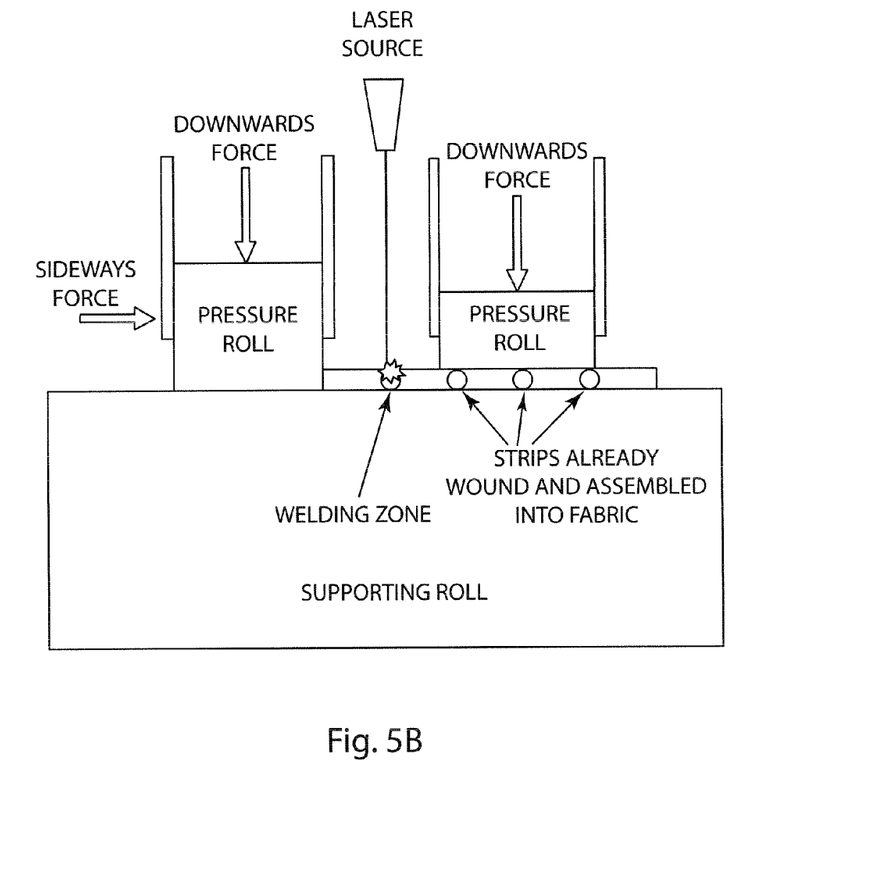

Two non-limiting examples of apparatuses for assembling strip 16 into a fabric 10 in accordance with this invention are shown in FIGS. 5(A) and 5(B). In assembling the fabric 10, concurrently or substantially concurrently with the application of an energy source, at least a portion of the fabric being made may be subject to a sideways force as illustrated in FIGS. 5(A) and 5(B). For example, as illustrated in FIGS. 5(A) and 5(B), a strip being unwound from a supply reel (for example reel 26 of FIG. 2) is being assembled to a portion of an already-formed fabric. The process comprises winding a strip of polymeric material, placing it adjacent to a previously wound strip, and adding the gap filler material or rod within the gap formed between the adjoining edges, and applying energy to the filler material or rod to form a "seam." The seam area may include first and second edge surfaces with the filler material. Exemplary energy sources include an ultrasonic horn (FIG. 5(A)) and a laser beam (FIG. 5(B)).

In the above embodiments, portions of the ribbon 16, for example first and second edge surfaces 36, 38 or upper and lower surfaces 32, 34, may be treated with a functional coating. Functional coatings may include an infrared (IR) or laser absorbing material or the functional coating may provide a texture to one or more surfaces of the ribbon 16. A functional coating may be applied prior to spirally wrapping the ribbon strip 16 to either to the full strip or just the edge areas to form a fabric 10, or the functional coating may by applied after the fabric 10 is assembled. If a functional coating is applied to the ribbon 16 before spirally wrapping the ribbon to form the fabric, an additional coating or coatings may be applied to one or more surfaces after the fabric is formed. The additional coating or coatings may be the same as, or different than, any coating applied prior to forming the fabric.

A textured surface may also be formed on at least an inner surface 12 or outer surface 14 of fabric 10 by processes known in the art, such as, for example, sanding, graving, embossing or etching.

The fabric may have smooth inner 12 and outer 14 surfaces as produced, or the fabric may be processed to achieve the desired smooth surface. The process or processes used to form the smooth surface may be a coating process or may be a mechanical process known to the art.

Figure 6:
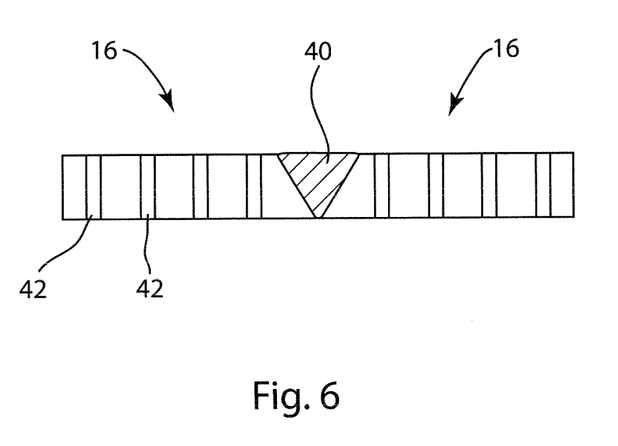
FIG. 6 is a cross-sectional view of a fabric, belt or sleeve according to one aspect of the present invention.

The fabric 10 may be impermeable to air and or water. In some embodiments, a portion of the fabric, or the entire fabric, may be made permeable to air or water, for example, by forming passages through the thickness t of the fabric. Passages 42 as illustrated in FIG. 6 may be formed by mechanical operations, such as punching or drilling, or by thermal operations, such as laser drilling. FIG. 6 illustrates a permeable fabric made according to the embodiment of FIG. 4(A), although any other embodiment may be made permeable by a similar process. In some applications, it may be desirable to provide predictable permeability in certain areas by providing passages 42 of a predetermined size or shape in a preselected pattern. In some instances, this may require providing a passage 42 through the filler material or rod 40 in a seam area.

Passages 42 may be circular in shape, and may have diameters ranging from 0.12 mm to 2.54 mm or larger. Other shapes or sizes may be used to create a permeable to air and/or water regions as desired.

The strips of material, commonly produced as polymeric ribbon or industrial strapping material, described in the above embodiments may include a reinforcing material to improve the mechanical strength of the overall structure. For example, the reinforcing material may be fibers or yarns that can be oriented in the machine direction (MD) of the strip. The reinforcement may be oriented parallel to the longitudinal axis of the strip of material 16 along the length of the strapping material, or they may be oriented at an angle to the longitudinal axis of the strip 16. The reinforcing material may be included through an extrusion or pultrusion process where the fibers or yarns may be extruded or pultruded along with the material forming the strip of material or strapping material. They may be fully embedded within the material of the strapping or they may be partially embedded onto one or both surfaces of the strapping material, or both. Reinforcing fibers or yarns may be formed of a high-modulus material, such as for example, aramids, including but not limited to Kevlar® and Nomex®, and may provide extra strength, tensile modulus, tear and/or crack resistance, resistance to abrasion and/or chemical degradation to the strip of material or strapping material. Broadly, the reinforcing fibers or yarns may be made from organic or inorganic materials, or thermoplastic and/or thermosetting polymers. Non-limiting examples of suitable fiber materials include polyester, polyethylene, polyamide, glass, carbon, and metals such as steel.

In embodiments where industrial strapping is used as the strip of material, strapping is usually supplied in continuous lengths with the product having a rectangular cross section. It is a tough, general purpose, usually untreated polyester strip with excellent handling characteristics, which makes it suitable for many industrial applications. It has excellent mechanical strength and dimensional stability as noted earlier, and does not become brittle with age under normal conditions. Strapping has good resistance to moisture and most chemicals, and can withstand temperatures of −70 degrees C. to 150 degrees C. or more. Typical cross-sectional dimensions of a strapping material that may be used in the present invention are, for example, 0.30 mm (or more) thickness and 10 mm (or more) width. The strapping may be formed with the desired lengthwise edge profile as discussed above, or the profile may be formed in a separate machining step.

While uniaxial strapping is found to have the maximum MD modulus, properties other than modulus may also be important. For example, if the MD modulus is too high for the strapping material, then crack and flex fatigue resistance of the final structure may be unacceptable. Alternatively, CD properties of the final structure may also be important. For instance, when referring to PET material and material strips of the same thickness, non-oriented strips may have a typical MD modulus of about 3 GPa and strength of about 50 MPa. On the other hand, a biaxially oriented strip may have a MD modulus of about 4.7 GPa and strength of about 170 MPa. It is found that modifying the processing of a uniaxial strip such that the MD modulus may be between 6-10 GPa and strength may be equal to or greater than 250 MPa, may result in a strip with CD strength approaching, approximately, 100 MPa. Further the material may be less brittle, i.e. it may not crack when repeatedly flexed, and may process better when joining the strips together. The bond between the strips may also resist separation during the intended use on the production machine.

One method to hold together and bond/join the adjacent strips, according to one embodiment of the invention, is to adhere adjacent strips edges with a gap filler material while an assembly apparatus simultaneously providing a sideways pressure to keep the edges in contact with each other. The filler material may be a reactive material, for instance a material reactive to an energy source, such as, for example, infrared radiation (IR), ultrasonic waves, a laser beam, or another energy source. The adhesive properties of the filler material may change in reaction to the application of energy from, for example, the assembly apparatus.

Figure 7A:
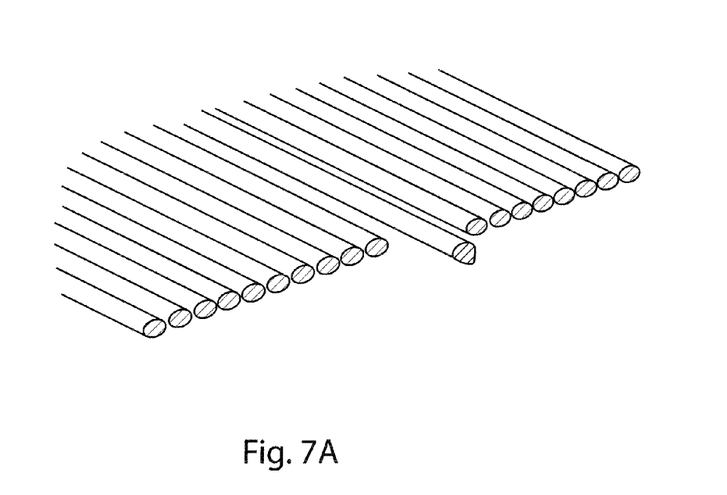
FIGS. 7A-7C are illustrative of strips adhered together with a filler material, according to one aspect of the present invention.
Figure 7B:
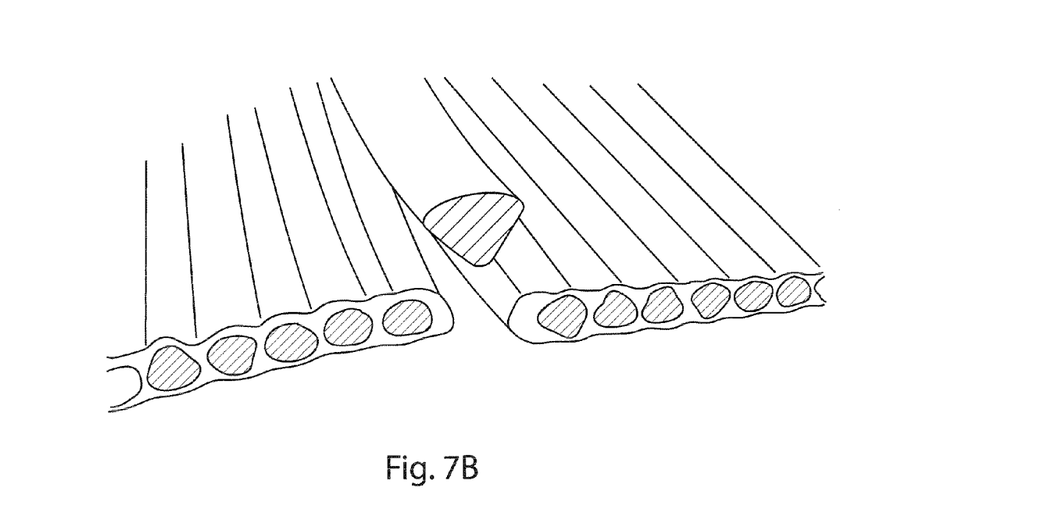
Figure 7C:
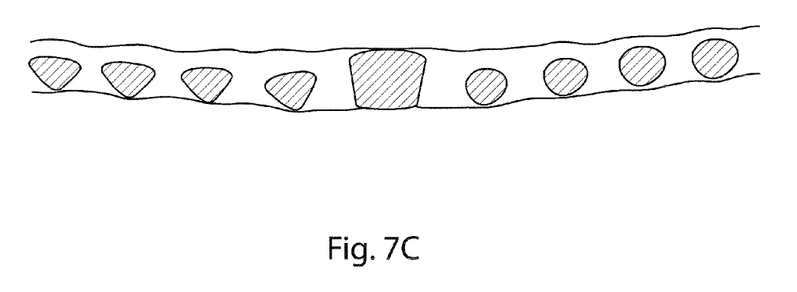

For example, one part of the assembly apparatus can hold one strip, preferably the strip that has already been wound into a spiral, down against a supporting roll while another part of the apparatus applies or inserts a gap filler material of the appropriate cross sectional shape and dimension nest to an edge of the first strip. The apparatus may also push a second strip, preferably the strip being unwound, up against the strip being held down, with the gap filler material adjacent to each edge. An energy source, for example ultrasonic or laser, may be applied to the filler, adjacent areas of the strips, or both the filler and the strip material edges as needed to sufficiently react the filler, or the strip material, or both the filler and the strip material, to form the desired bond between the adjacent edges. Two non-limiting examples of assembly apparatus adapted to create such a bond are illustrated in FIGS. 5(A) and 5(B). Examples of strips adhered together with a filler material are illustrated in FIGS. 7A-7C.

The present invention relates to papermaker's fabrics, namely the forming, press, dryer fabrics, and through air dryer (TAD) fabrics, also known as paper machine clothing, on which paper is manufactured on a paper machine. Also, the invention may be used as a substrate for a shoe press or transfer or calender belt, any of which can also be used on a paper machine. In addition, the present invention may be applied in other industrial settings where industrial belts are used to convey and/or dewater a material. Furthermore, the present invention may be used as a belt and/or sleeve used in the production of nonwovens by processes such as airlaid, melt blowing, spunbonding, and hydroentangling The inventive fabric, as noted earlier, may be used as a substrate for use in a forming fabric, press fabric, dryer fabric, through air dryer (TAD) fabric, shoe press or transfer or calender belt, or a process belt used for a dewatering process, or in airlaid, melt blowing, spunbonding, hydroentangling processes. The inventive fabric, belt or sleeve may include one or more additional layers, for example textile layers, on top of or under the substrate formed using the strips of material. For example, a MD yarn array may be laminated to the backside of the belt or sleeve to create void spaces. Alternatively, the one or more layers may be provided in between two layers of industrial fabric made according to this invention. The additional layers used may be any of woven or nonwoven materials, MD or CD yarn arrays, spirally wound strips of woven material that have a width less than the width of the fabric, fibrous webs, films, or a combination thereof, and may be attached to the substrate using any suitable technique known to one of ordinary skill in the art. Needle punching, thermal bonding and chemical bonding are but few examples.

As noted earlier, the industrial fabric, belt or sleeve of the invention may be used in the forming, press and dryer sections, including a through air dryer (TAD), of a paper machine. The fabric, belt or sleeve may also be used as a sheet-transfer, shoe press or calender belt, or as other industrial process belts, such as corrugator belts. The inventive fabric, belt or sleeve may have a texture on one or both surfaces, which can be produced using any of the means known in the art, such as for example, sanding, graving, embossing or etching. The fabric may also be used as part of a textile finishing belt, such as a sanforizing belt or tannery belt, for example. Moreover, the fabric, belt or sleeve of the invention may be used in other industrial settings where industrial belts are used to convey and/or dewater a material. For example, the fabric, belt or sleeve may be used as a pulp-forming or pulp-pressing belt, in a belt used to dewater recycled paper during the deinking process, such as a dewatering belt on a double-nip-thickener (DNT) deinking machine; or in a sludge dewatering belt.

According to one exemplary embodiment, the fabric, belt or sleeve of the present invention may optionally include a functional coating on one or both of its surfaces. The functional coating may have a top surface that is planar or smooth, or may alternatively be textured in some manner using any of the means known in the art, such as for example, sanding, graving, embossing or etching. The functional coating can be any of the materials known to one of ordinary skill in the art, such as for example, polyurethane, or silicone, or any other polymeric resin material or even rubber, and the functional coating may optionally include particles such as nano fillers, which can improve resistance to flex fatigue, crack propagation or wear characteristics of the inventive fabric, belt or sleeve.

The fabric, belt or sleeve of the present invention may also be used as a reinforcing base or substrate in a forming fabric, press fabric, dryer fabric, through air dryer (TAD) fabric, shoe press or transfer or calender belt, a process belt used in airlaid, melt blowing, spunbonding, or hydroentangling processes, sheet-transfer belt, shoe press belt, calender belt, corrugator belt, sanforizing belt, tannery belt, pulp-forming or pulp-pressing belt, dewatering belt on a double-nip-thickener (DNT) deinking machine, or a sludge dewatering belt.

Although preferred embodiments of the present invention and modifications thereof have been described in detail herein, it is to be understood that the invention is not limited to these precise embodiments and modifications, and that other modifications and variations may be effected by one skilled in the art without departing from the spirit and scope of the invention as defined by the appended claims.

What is claimed is:

1. An endless industrial belt or sleeve comprising:
   a polymeric material in the form of a ribbon comprising
      a first longitudinal edge surface having a first edge profile, and
      a second longitudinal edge surface having a second edge profile,
   said polymeric material being spirally wound in a plurality of turns such that the first longitudinal edge surface of said polymeric material abuts said second longitudinal edge surface of an adjacent spiral turn of said polymeric material, thereby forming a gap therebetween; and
   a filler material inserted in said gap, wherein a cross-sectional shape and dimension of said filler material corresponds to the cross-sectional shape and dimension of said gap,
   wherein said first and second edge profiles include a shape adapted to accept the filler material configured as a profiled rod.

2. The belt or sleeve according to claim 1, wherein said ribbon material has a thickness of 0.30 mm or more, and a width of 10 mm or more.

3. The belt or sleeve according to claim 1, wherein said belt or sleeve is impermeable to air and/or water.

4. The belt or sleeve according to claim 1, wherein said belt or sleeve is permeable to air and/or water.

5. The belt or sleeve according to claim 4, wherein said belt or sleeve is made permeable to air and/or water through voids or holes through said belt or sleeve, said voids or holes created using a mechanical or thermal means.

6. The belt or sleeve according to claim 5, wherein said voids or holes are formed in a predetermined size, shape or orientation.

7. The belt or sleeve according to claim 6, wherein said voids or holes have a nominal diameter in the range of 0.12 mm to 2.54 mm or more.

8. The belt or sleeve according to claim 1 further comprising:
   an upper surface and
   a lower surface generally parallel to said upper surface,
   wherein said belt or sleeve has a texture on one or both surfaces.

9. The belt or sleeve according to claim 8, wherein said texture is provided by sanding, graving, embossing or etching.

10. The belt or sleeve according to claim 1, wherein said belt or sleeve is smooth on one or both surfaces.

11. The belt or sleeve according to claim 1, wherein said belt or sleeve comprises at least two layers of polymeric materials spirally wound in opposite directions to each other, or opposite to the MD.

12. The belt or sleeve according to claim 1, further comprising a functional coating on one or both sides of said belt or sleeve.

13. The belt or sleeve according to claim 12, wherein said functional coating has a texture on at least one side of the belt.

14. The belt or sleeve according to claim 12, wherein said functional coating provides an infrared (IR) absorbing layer.

15. The belt or sleeve according to claim 1, wherein said polymeric ribbon material includes a reinforcing material, the reinforcing material selected from the group consisting of fibers or yarns.

16. The belt or sleeve according to claim 15, wherein said fibers or yarns are made of a material selected from the group consisting of aramids, thermoplastic polymers, thermosetting polymers, glass, carbon, and steel.

17. The belt or sleeve according to claim 1, wherein said first and second edge profiles are adapted to accept said filler material.

18. The belt or sleeve according to claim 17, wherein said filler material facilitates joint formation.

19. The belt or sleeve according to claim 17, wherein said filler material includes a reinforcing material.

20. The belt or sleeve according to claim 17, wherein said filler material includes profiled surfaces corresponding to the first and second edge profiles.

21. The belt or sleeve according to claim 1, wherein said profiled rod is configured with a circular, oval, rectangular, or triangular cross section.

22. The belt or sleeve according to claim 17, wherein said filler material and/or said edge surfaces is at least partially melted and bonded using IR radiation, laser, or ultrasonic energy.

23. A method for forming a belt or sleeve, the method comprising the steps of:
spirally winding one or more strips of polymeric material around a plurality of parallel process rolls, wherein said one or more strips of polymeric material is a ribbon material comprising a first longitudinal edge surface including a first edge surface profile and a second longitudinal edge surface including a second edge surface profile, wherein the first longitudinal edge surface profile abuts said second longitudinal edge surface profile of an adjacent spiral turn of said polymeric material, thereby forming a gap therebetween; and
inserting a filler material in said gap, wherein a cross-sectional shape of said filler material corresponds to the cross-sectional shape of said gap,
wherein said first and second edge surface profiles include a shape adapted to accept the filler material configured as a profiled rod.

24. The method according to claim 23, wherein energy from a laser, infrared or ultrasonic source is applied to at least partially melt a portion of the edge surfaces of the strip and/or the filler material to bond/join said edges to each other.

25. The method according to claim 23, wherein said polymeric strip material has a thickness of 0.30 mm or more, and a width of 10 mm or more.

26. The method according to claim 23, wherein said belt or sleeve is impermeable to air or water.

27. The method according to claim 23, further comprising the step of creating a permeable to air and/or water belt or sleeve by forming voids or holes through said fabric, said voids or holes created using a mechanical or thermal means.

28. The method according to claim 27, wherein said voids or holes are formed in a predetermined size, shape or orientation.

29. The method according to claim 27, wherein said voids or holes have a nominal diameter in the range of 0.12 mm to 2.54 mm or more.

30. The method according to claim 23, wherein said one or more strips of polymeric material are formed with said profiled longitudinal edge surfaces.

31. The method according to claim 23, wherein said first and second edge surface profiles are formed on said strips of polymeric material after said strips of material are formed.

32. The method according to claim 23, wherein said belt or sleeve includes an upper surface and a lower surface, at least one surface is provided with a texture.

33. The method according to claim 32, wherein said texture is provided by sanding, graving, embossing or etching.

34. The method according to claim 23, wherein said belt or sleeve is smooth on one or both surfaces.

35. The method according to claim 23, further comprising the step of coating one or both sides of the belt or sleeve with a functional coating.

36. The method according to claim 35, further comprising the step of providing a texture to the functional coating.

37. The method according to claim 23, further comprising the step of reinforcing said polymeric ribbon material in the MD of the sleeve or belt with fibers or yarns.

38. The method according to claim 37, wherein said fibers or yarns are made of a material selected from the group consisting of aramids, thermoplastic polymers, thermosetting polymers, glass, carbon, and steel.

39. The method according to claim 23 further comprising the step of:
providing said filler material including profiled surfaces corresponding to the first and second edge profiles.

* * * * *